(12) United States Patent
Athias

(10) Patent No.: US 9,055,013 B2
(45) Date of Patent: *Jun. 9, 2015

(54) INTEGRATION OF VOICE CHAT SERVICES

(71) Applicant: Comcast Cable Communications, LLC., Philadelphia, PA (US)

(72) Inventor: Franklyn Athias, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,559

(22) Filed: Jan. 5, 2014

(65) Prior Publication Data

US 2014/0119365 A1    May 1, 2014

Related U.S. Application Data

(63) Continuation of application No. 13/617,833, filed on Sep. 14, 2012, now Pat. No. 8,634,411, which is a continuation of application No. 12/470,738, filed on May 22, 2009, now Pat. No. 8,315,249.

(51) Int. Cl.
| | |
|---|---|
| *H04M 1/64* | (2006.01) |
| *H04M 11/00* | (2006.01) |
| *H04L 12/66* | (2006.01) |
| *G06F 15/16* | (2006.01) |
| *H04L 12/58* | (2006.01) |
| *H04M 7/00* | (2006.01) |
| *H04L 29/06* | (2006.01) |
| *H04L 29/12* | (2006.01) |

(52) U.S. Cl.
CPC ............. *H04L 51/04* (2013.01); *H04L 12/581* (2013.01); *H04L 29/12122* (2013.01); *H04L 29/12896* (2013.01); *H04L 61/1547* (2013.01); *H04L 61/605* (2013.01); *H04M 7/0045* (2013.01); *H04L 65/104* (2013.01); *H04L 65/40* (2013.01); *H04L 65/1053* (2013.01); *H04L 65/103* (2013.01)

(58) Field of Classification Search
CPC .................. H04L 12/1813; H04M 2203/459; H04M 3/5191; H04M 2215/202; H04M 15/56
USPC ............ 379/93.01, 67.1, 88.08, 88.12, 88.13, 379/202.01, 88.11, 220.01, 88.01, 88.17, 379/68, 69, 88.09, 88.16; 370/352, 465; 709/227, 206, 204
See application file for complete search history.

(56) References Cited

U.S. PATENT DOCUMENTS

| | | |
|---|---|---|
| 7,428,303 B2 | 9/2008 | Campbell et al. |
| 2003/0185232 A1 | 10/2003 | Moore et al. |

(Continued)

OTHER PUBLICATIONS

Search Report for European Application No. 10162665.3, mailed Jul. 19, 2010, 8 pages.

*Primary Examiner* — Thjuan K Addy
(74) *Attorney, Agent, or Firm* — Banner & Witcoff, Ltd.

(57) ABSTRACT

A communication system provides a user with the ability to redirect telephone calls to a voice chat account and vice versa. In one example, a voice chat gateway may receive communication requests and determine whether communications directed to a first party is to be redirected. If so, the voice chat gateway may reroute the communication request to an appropriate destination. For instance, a user may request that all communications such as telephone calls be rerouted as a voice chat to the user's voice chat account. Alternatively, a user may request that all communications including voice chats be redirected to a telephone number. Users may further be allowed to call a voice chat account through a telephone network and initiate a voice chat with a telephone number through a data network.

22 Claims, 10 Drawing Sheets

(56) References Cited

U.S. PATENT DOCUMENTS

| | | |
|---|---|---|
| 2004/0161089 A1 | 8/2004 | Hanson et al. |
| 2005/0259638 A1 * | 11/2005 | Burg .............................. 370/352 |
| 2005/0286498 A1 | 12/2005 | Rand et al. |
| 2006/0023695 A1 | 2/2006 | Yarlagadda et al. |
| 2008/0133580 A1 | 6/2008 | Wanless et al. |
| 2011/0200179 A1 | 8/2011 | Moore et al. |

* cited by examiner

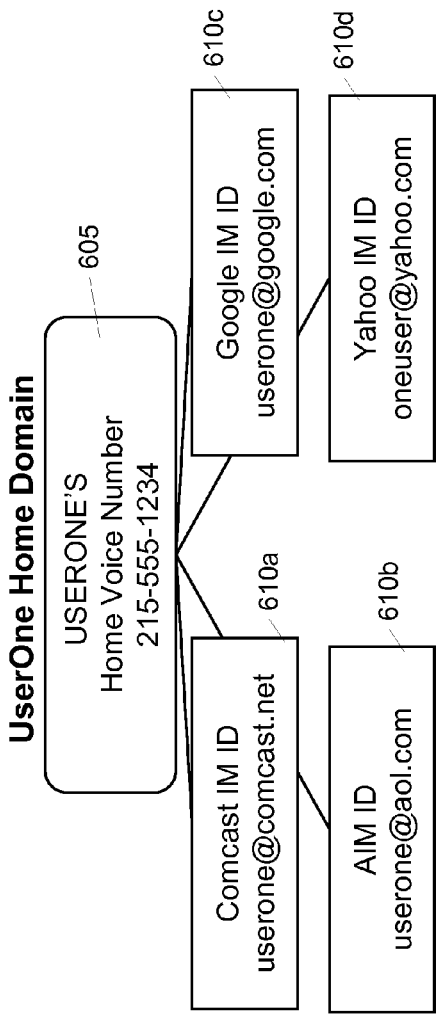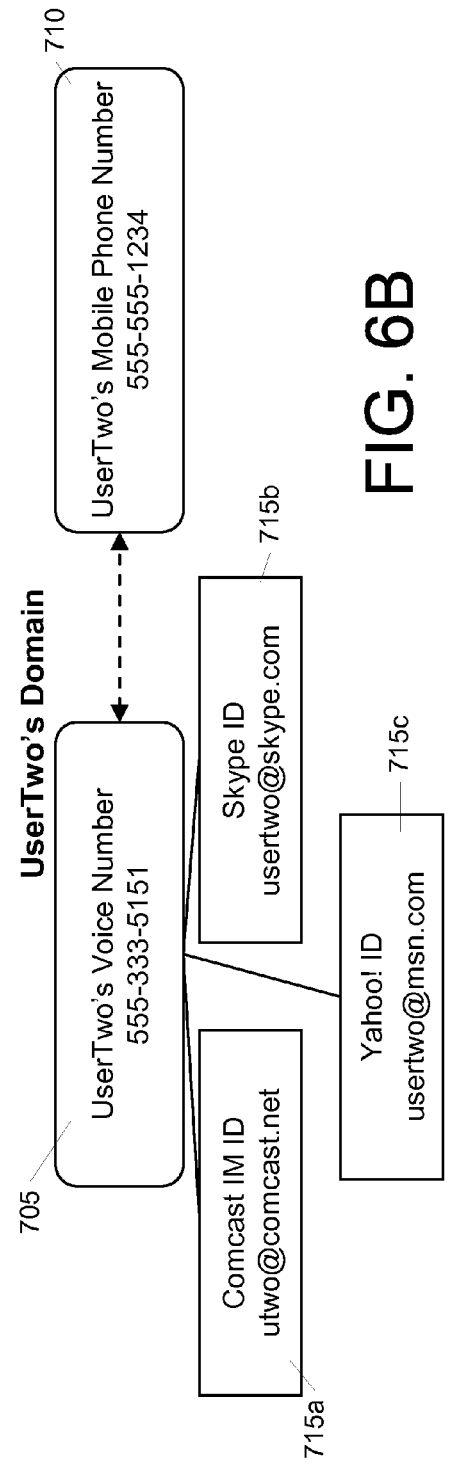

INTEGRATION OF VOICE CHAT SERVICES

CROSS-REFERENCE OF RELATED APPLICATIONS

This application is a continuation of U.S. application Ser. No. 13/617,833, entitled "INTEGRATION OF VOICE CHAT SERVICES," and filed on Sep. 14, 2012, which is a continuation of U.S. application Ser. No. 12/470,738, entitled "INTEGRATION OF VOICE CHAT SERVICES," filed May 22, 2009, and issued as U.S. Pat. No. 8,315,249 on Nov. 20, 2012. The contents of the above noted applications are hereby incorporated by reference in their entirety.

BACKGROUND

Voice communications over telephone networks has remained largely separate from voice chat communications over a data network such as the Internet. In particular, voice chat communication and telephone communications have not been integrated such that one party using voice chat communication may communicate with another party using a telephone. Similarly, services offered for voice chat services might not be available through telephone services and vice versa. With the growing prevalence of voice chatting over data networks and the continued popularity of telephone communications, an integration of the two services would be beneficial.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

According to one or more aspects, voice chat services may be integrated with telephone communications through a voice chat gateway. A voice chat gateway may be configured to receive communication requests (whether voice chat or telephone) and determine whether redirection or rerouting is desired. This determination may be based on configuration settings defined by the user. For example, if a voice chat request directed to a user's voice chat account is received, the voice chat gateway may determine whether the user has requested that voice chats be redirected to a telephone line. If so, the voice chat gateway may identify a telephone number to which the communication request is to be redirected and establish a connection with the user at the identified telephone number. Conversely, if a telephone call is directed to the user and the user requests that the telephone call be redirected to the user's voice chat account, a voice chat address may be identified. The voice chat gateway may then establish a voice chat connection with the user at the identified voice chat address. The voice chat gateway may then be configured to relay voice communications and/or other data between a voice chat address and a telephone number.

According to another aspect, a voice chat gateway may serve as a proxy for a user to maintain a presence on a messaging service. As a proxy, the voice chat gateway may field or initiate voice chat requests. Alternatively or additionally, the voice chat gateway may provide its own messaging service that is configured to federate with one or more third-party messaging services. By federating with other messaging services, the voice chat gateway might not need to login to the other messaging services to access various proprietary messaging service functions.

According to another aspect, a voice chat gateway may enable a user to use a telephone device to call a voice chat address. For example, a user may enter userone@zyx.com as a call recipient instead of a telephone number into the user's telephone device. The voice chat gateway may then establish a voice chat session with a called party using the specified voice chat address and relay audio communication (and other data) between the two parties.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIGS. 6A and 6B illustrate example associations between voice chat accounts and telephone numbers according to one or more aspects described herein.

DETAILED DESCRIPTION

Figure 1:
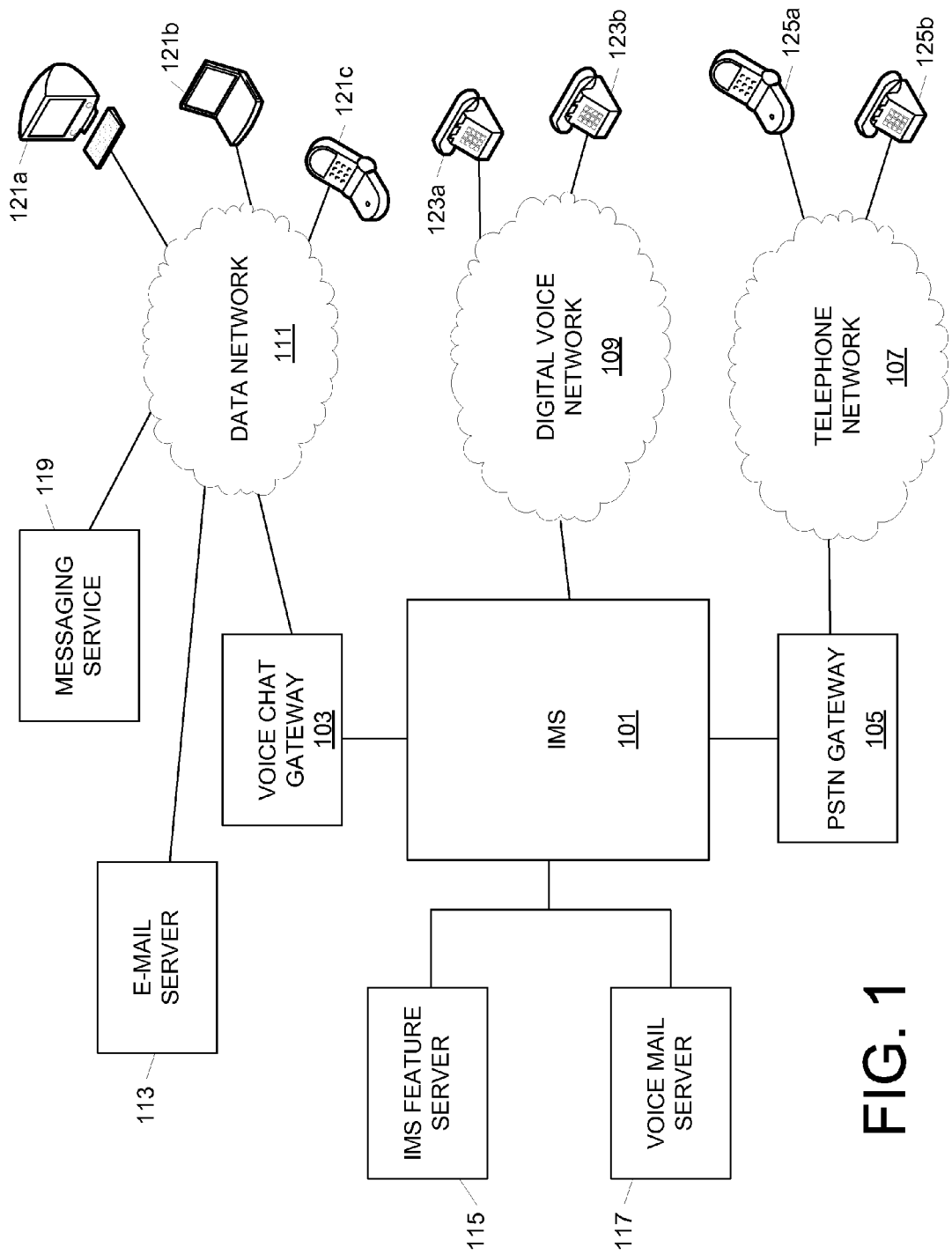
FIG. 1 illustrates an example network distribution system in which content items may be provided to subscribing clients.

FIG. 1 illustrates an example communication network that allows a user to configure how calls should be directed (e.g., either to voice chat or to a telephone) and managed. The communication network may include multiple portions including a public switched telephone network (PSTN) 107, a digital voice network 109 and a data network 111. PSTN 107 and digital voice network 109 may both be considered dedicated telephone or voice communication networks. A digital voice network 109 may operate by digitizing voice communication and transmitting the data over the network. The digital voice network 109 may operate using an underlying cable network or a fiber optic network. In one or more configurations, the digital voice network 109 might only be accessible to subscribers to a service provider. Data network 111 may include a wide area network (WAN) such as the Internet. The networks 107, 109 and 111 may interoperate through interconnected systems including Internet Protocol (IP) Multimedia Subsystem (IMS) 101 configured to manage the operations of and services offered by a service provider over the digital voice network 109, PSTN gateway 105 configured to process communications to and from a public switched telephone network such as telephone network 107, and voice chat gateway 103 configured to process and manage communications over data network 111 (e.g., the Internet). For example, IMS 101 may include an ERICSSON IMS solution. IMS 101 may also include components such as a CISCO CALL MANAGER soft-switch.

IMS 101 provides various services and features to a network of subscribers through digital voice network 109. Services may include voice communications, voicemail, call forwarding, call waiting, caller identification (ID) and the like. In one example, voice mail server 117 provides a database in which voice mail messages may be stored. Accordingly, IMS 101 may direct voice mail messages to voice mail server 117 if a called party is not currently available (e.g., line is busy, no answer, etc.). IMS 101 may further interact with IMS feature server 115 to control connection services, select processes/services that may be applied to a call, provide routing within a network such as digital voice network 109, and the like.

By interfacing with PSTN gateway 105, IMS 101 may receive public switched telephone calls and digitize the calls, as needed, so that they may be directed to subscribers of digital voice network 109, voice mail server 117 or a recipient on data network 111 through voice chat gateway 103. IMS 101 may register telephone numbers through PSTN gateway 105 such that calls to a number associated with a digital voice network subscriber may be routed appropriately. Additionally, PSTN gateway 105 provides IMS 101 with a way to access telephone network 107 so that calls originating from a communication device subscribed to digital voice network 109 (e.g., phones 123) or data network 111 (phones 121) may be properly directed to an individual on telephone network 107.

Voice chat gateway 103 provides IMS 101 with the capability to process voice chat communications over data network 111. For example, if a voice chat communication is received from messaging service 119, voice chat gateway 103 may be configured to determine an intended recipient of the voice chat communications and instruct IMS 101 to process the voice chat communications appropriately. Messaging service 119 may include an instant messaging service having voice chat capabilities such as those provided by Yahoo, Google, AOL and Skype. Messaging service 119 may provide voice chat capabilities by streaming audio signals between computing devices of two parties (e.g., personal computer 121a and laptop 121b). Voice chat gateway 103 may further be configured to process voice chat communications in accordance with a specified protocol depending on the network on which the intended recipient is receiving the communications, e.g., digital voice network 109 or public switched telephone network 107.

Voice chat gateway 103 may be configured to interface with messaging service 119 in a variety of ways. In one example, voice chat gateway 103 may act as a proxy for a user having an account with messaging service 119. A user would thus provide his or her account credentials to the voice chat gateway 103 and voice chat gateway 103 would, in turn, maintain a presence on messaging service 119 as the user. For example, the voice chat gateway 103 may login to messaging service 119 as the user. Thus, communication directed to the user through messaging service 119 would be received by voice chat gateway 101 acting as a proxy for the user.

Alternatively, voice chat gateway 103 may provide its own messaging service (not shown) that is federated with messaging service 119. Federation of two messaging services generally refers to a sharing of protocols between the two services, allowing one messaging service to communicate with and invoke function calls of the other messaging service. In one example, a first user of a first messaging service may be able to see whether a second user of a second messaging service is on-line and communicate with the second user without having to subscribe to an account with the second messaging service if the two messaging services are federated. Federation may include the first messaging service having knowledge (e.g., through notifications from the second messaging service or another source) of all users logged into the second messaging service and vice versa. Accordingly, if a messaging service provided by the voice chat gateway 103 is federated with messaging service 119, voice chat gateway 103 may be configured to receive and intercept communications directed to subscribers of gateway 103's messaging service.

Further, according to one or more aspects, voice chat gateway 103 may be configured to interact with e-mail server 113 to deliver electronic mail messages to specified recipients. In one example, if a call was unsuccessful and a calling party has left a voicemail, voice chat gateway 103 may be configured to transmit an email to the called party notifying the called party of the missed call and the voicemail.

Figure 2A:
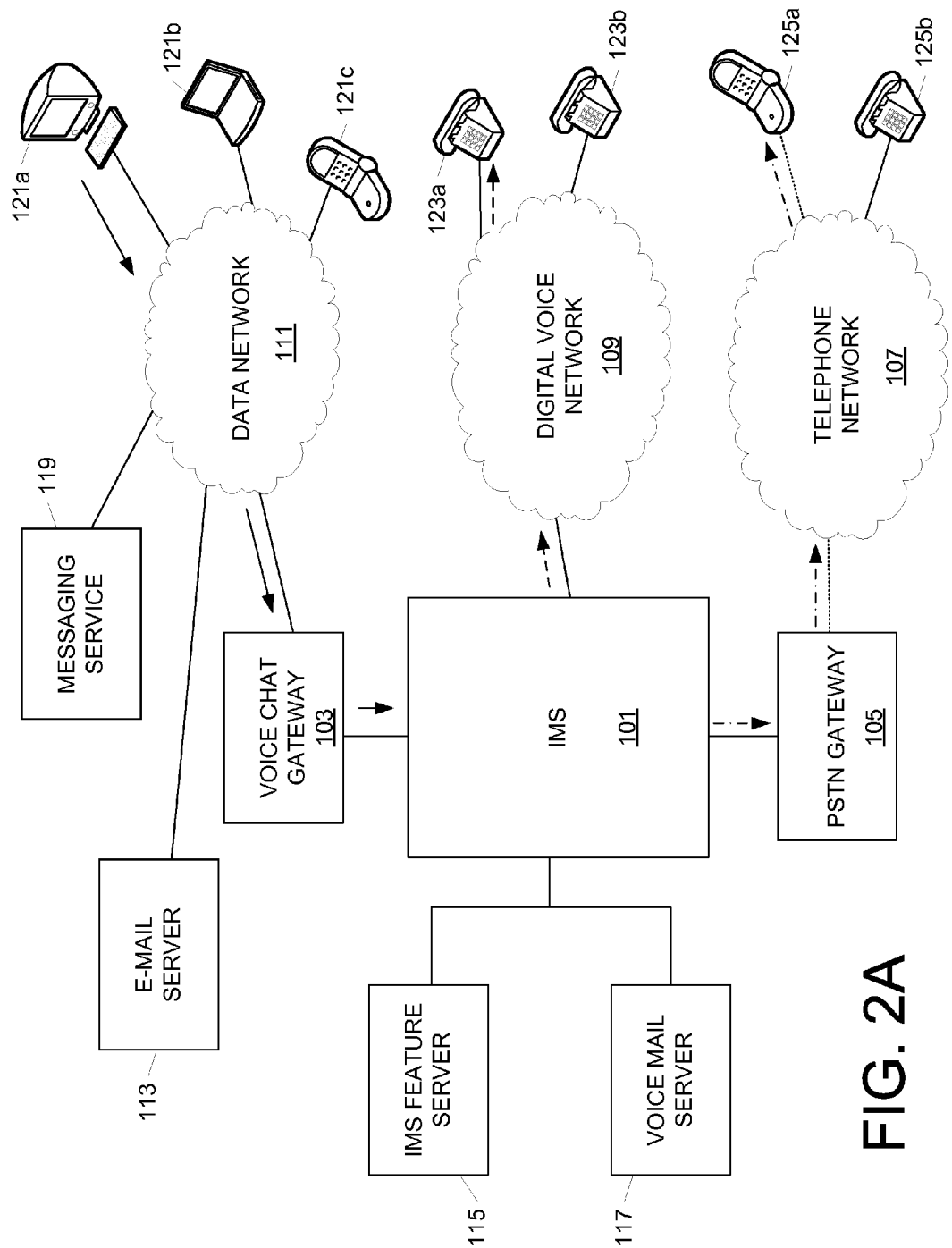
FIGS. 2A and 2B illustrate example communication flows through a voice chat gateway in accordance with one or more aspects described herein.

FIG. 2A illustrates an example communication flow when a voice chat request is received and a recipient of the voice chat request has elected to receive voice chats on a telephone device such as devices 123 and 125 (FIG. 1). Initially, a user of messaging service 119 may request a voice chat session with a subscriber of a telephone service provided through IMS 101. For example, IMS 101 may be a part of a cable multimedia service that is configured to provide telephone services (e.g., IP telephony). Voice chat gateway 103 may intercept or otherwise receive the voice chat request from messaging service 119 by either federation or proxy as described herein. Voice chat gateway 103 may then determine an address (e.g., a telephone number) to which received incoming communications are to be redirected. For example, a user may specify that voice communications addressed to the user's messaging service account are to be redirected to a particular telephone number corresponding to an account on digital voice network 109 or public switched telephone network 107. Voice chat gateway 103 may then create a voice chat session between the calling party and the called party at the determined address. Voice chat gateway 103 may establish a connection with the called party by forwarding communication information such as audio signals and call parameters to IMS 101 which may subsequently transmit the data through an appropriate path to a destination device. In one or more arrangements, voice chat gateway 103 may be configured to transcode the audio information prior to transmission to IMS 101. Transcoding may involve the conversion of data such as audio signals from one network or protocol format to another for compatibility purposes. Thus, in one example, transcoding of audio signals and data may include eliminating data that is not understood by a destination protocol or network. The destination device, upon receiving the communication request, may see caller identification information listed as userone@xyz.com instead of the traditional telephone number identifier.

If the determined address is recognized as a digital voice telephone network address, for example, IMS 101 may transmit the audio signals and call parameters to one of communication devices 123 corresponding to the address. If, on the other hand, the address is a PSTN address, IMS 101 may transmit communications for the voice chat session to PSTN gateway 105 for transmission to device 125a over network 107. Data and communications from the called party to the calling party (at PC 121a) may be transmitted through the reverse path.

Figure 2B:
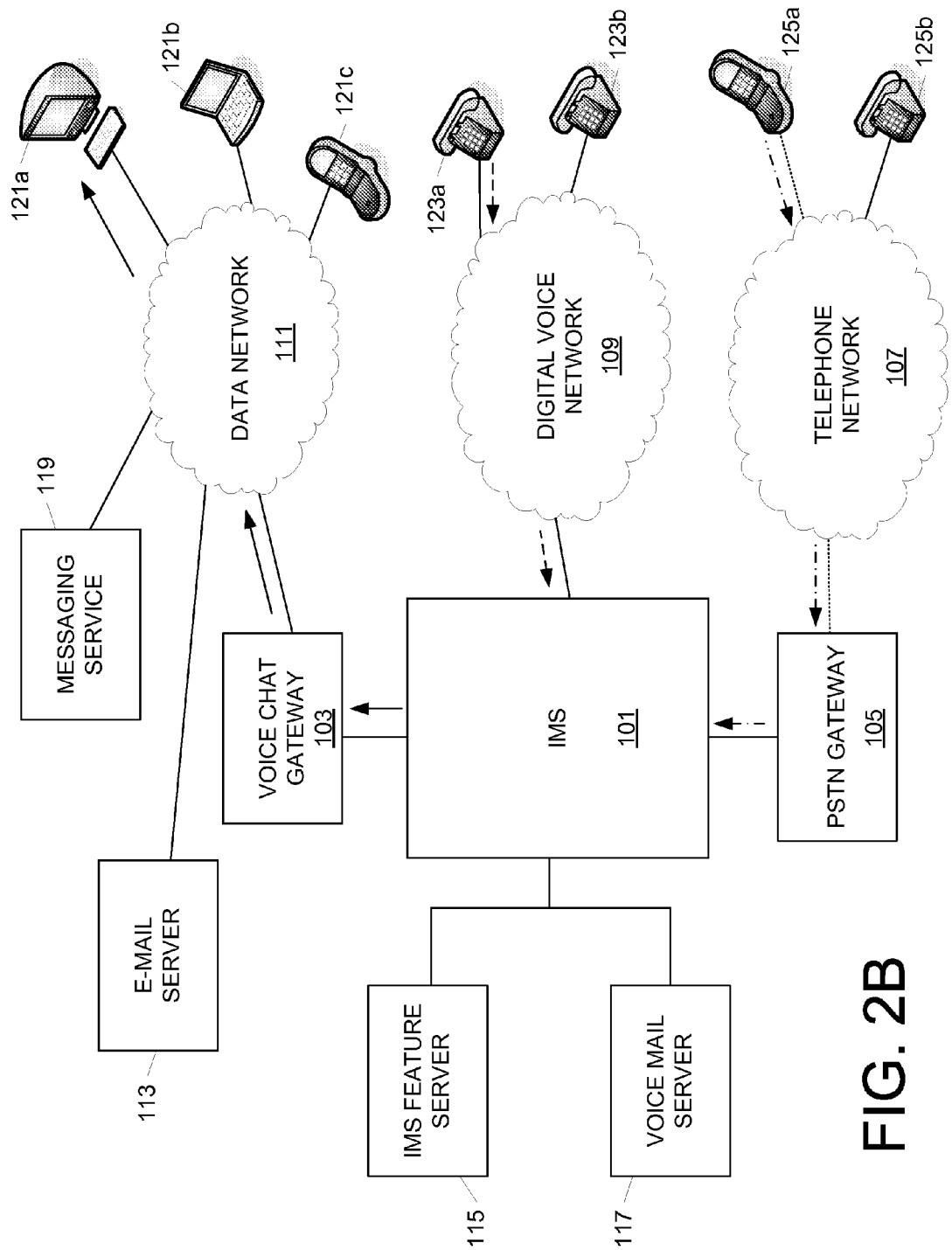

FIG. 2B illustrates an example communication flow when a telephone call is received and a called party has requested that communications be forwarded to a voice chat service. A telephone call may be received from different sources such as a public switched telephone network such as network 107 or a private digital voice telephone network such as network 109. Upon receipt of the telephone call at IMS 101, IMS 101 may be configured to query voice chat gateway 103 to determine a location or address at which the called party wishes to receive the call. The user may configure such redirection settings using a web portal or other interface (as described in further detail with respect to FIGS. 5A-5C). Upon determining that the called party would like to receive calls through a voice chat session, IMS 101 may forward the audio signals and other data associated with the call to voice chat gateway 103. Voice chat gateway 103 may then be configured to initiate a voice chat session with the called party and establish a voice chat connection between the called party's messaging service account and the calling party's communication device. In one or more examples, the called party may receive the voice chat request from 5555551234@telephone service-provider.com, or, alternatively or additionally, a voice chat account of the calling party. Examples of a PSTN gateway that may be used include HUAWEI MEDIA GATEWAY (UMG8900) and SONUS MEDIA GATEWAY (GSX4000).

Figure 4:
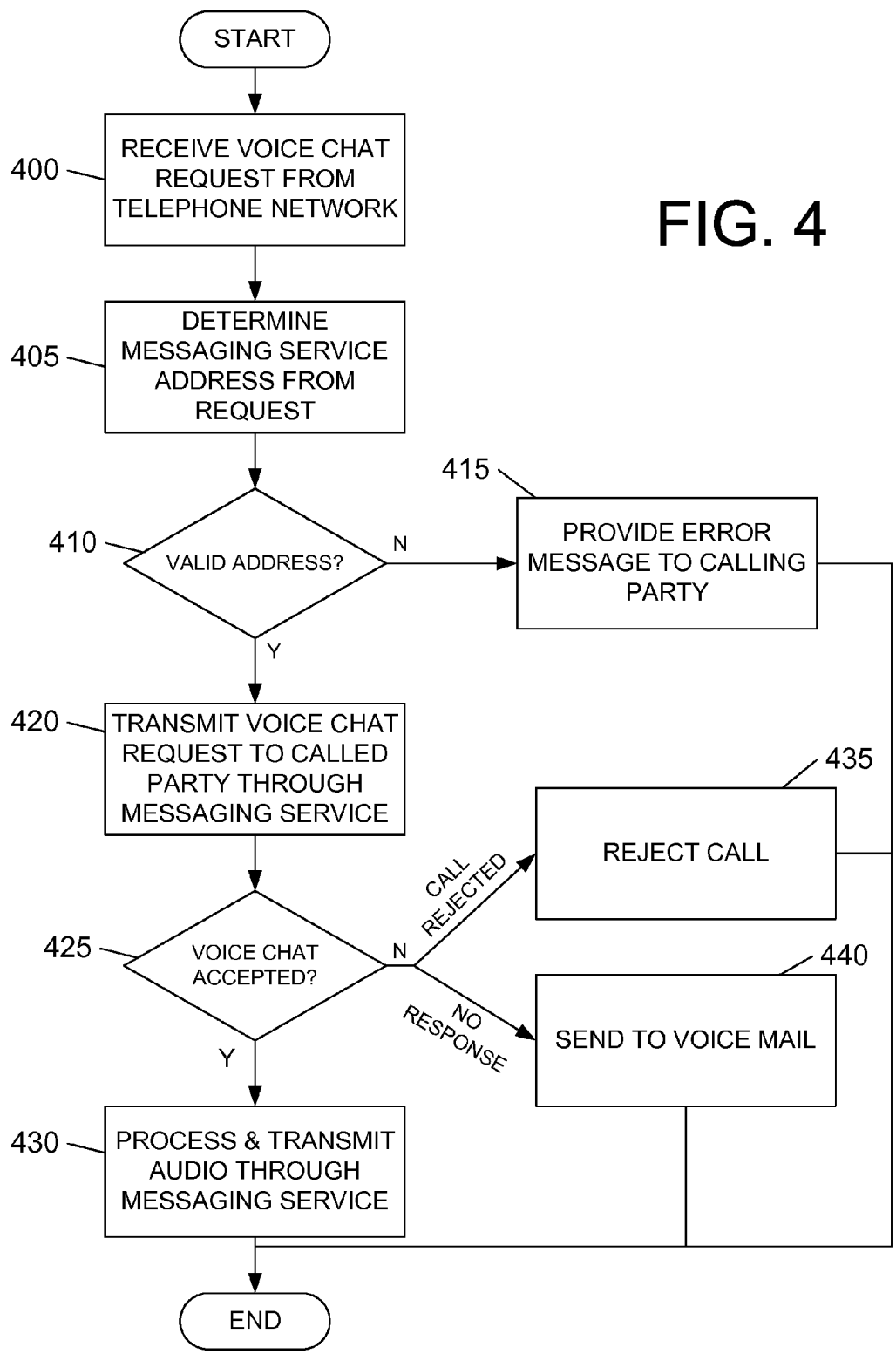
FIG. 4 illustrates an example method for processing a voice chat request received from a telephone network device according to one or more aspects described herein.

In some instances, a calling party may enter a messaging service account identifier as the address of the intended recipient of the call, as is described in further detail herein with respect to FIG. 4. In such cases, IMS 101 may automatically forward the call to voice chat gateway 103 upon determining that the address of the called party is not a traditional telephone number.

Figure 2C:
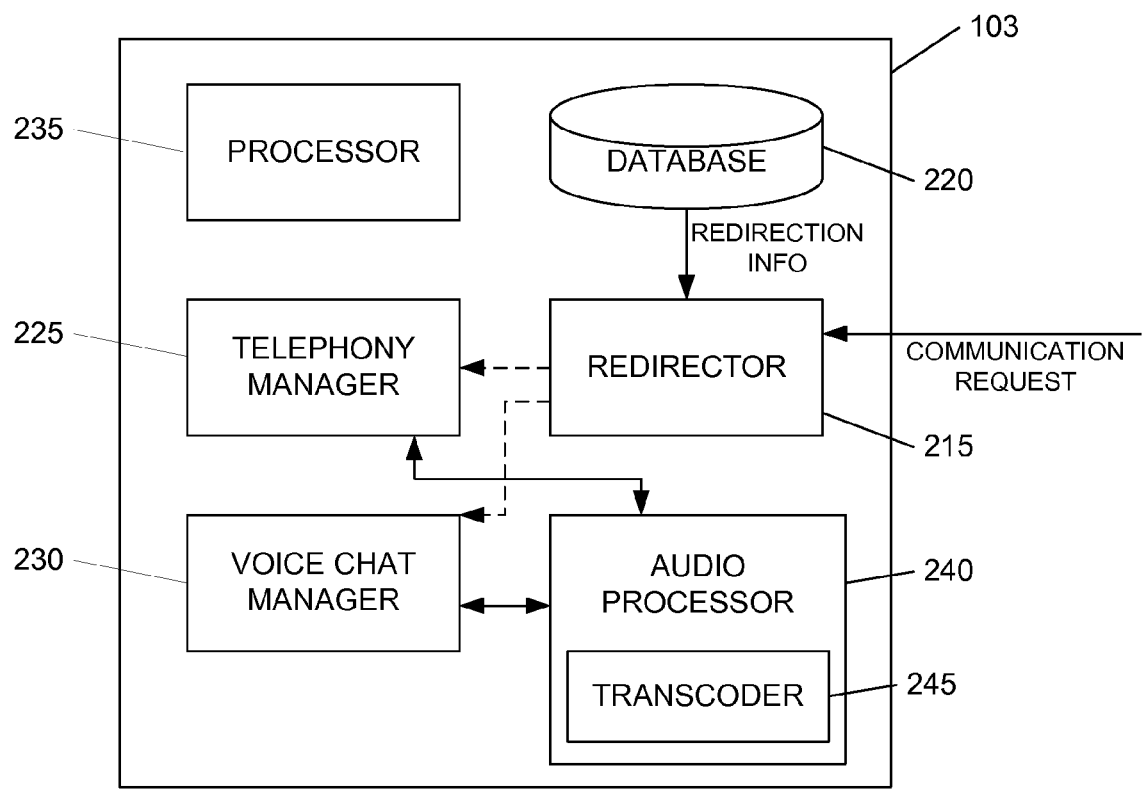
FIG. 2C is a block diagram of an example voice chat gateway according to one or more aspects described herein.

FIG. 2C illustrates an example voice chat gateway 103 and components that may be included therein such as redirector 215, database 220, telephony manager 225, voice chat manager 230, processor 235 and audio processor 240 including a transcoder 245. These components may comprise hardware and/or software modules configured to carry out functions as described below. Processor 235 may be generally configured to execute instructions and perform mathematical calculations required to perform one or more functions. Database 220 may be configured to store associations between telephone numbers and voice chat account identifiers. This association may be used as a basis for determining whether a requested redirection is authorized and may be user defined as described herein. Database 220 may further store other information including voice chat proxy information such as passwords, account names, security information and the like. Using the information stored in database 220, redirector 215 may determine whether an incoming communication request (e.g., a voice chat request for a telephone call) is to be redirected. If so, redirector 215 may determine the redirection address and forward the communication request to either telephony manager 225 or voice chat manager 230 as appropriate. Telephony manager 225, for example, may be configured to format voice communications for a telephone network. Voice chat manager 230, on the other hand, may be responsible for creating voice chat data packets for transmission through a messaging service. Voice chat manager 230 may also be configured to serve as a proxy for a user, provide its own messaging service and federate with other messaging services. In one or more arrangements, voice communications may be processed through audio processor 240 in accordance with a particular transmission protocol or network. In one example, audio processor 240 may include a transcoder 245 that is used to convert audio signals and data from a source protocol to a destination protocol.

Voice chat gateway 103, IMS 101 and other components described with respect to FIG. 1 may be provided as firmware, hardware, software or combinations thereof. Additionally, one or more of voice chat gateway 103, IMS 101, IMS feature server 115, voice mail server 117 and PSTN gateway 105 may be included in the same system or location or may be included in a distributed system in which one or more of the above components are remote from one another.

Figure 3:
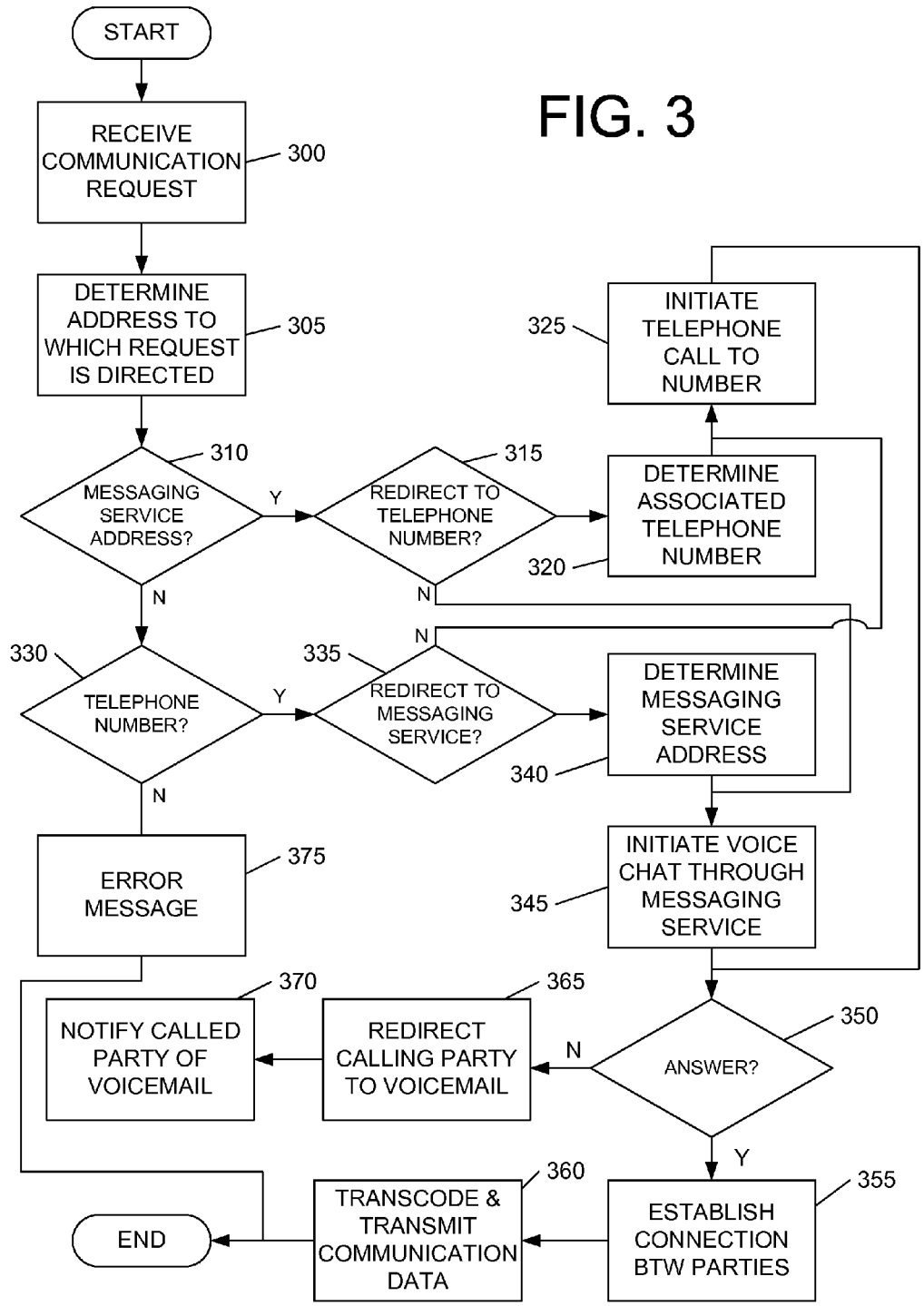
FIG. 3 illustrates an example method for processing and redirecting voice chats and telephone calls according to one or more aspects described herein.

FIG. 3 illustrates an example method for processing communication requests at a voice chat gateway (e.g., gateway 103 of FIG. 1). In step 300, the voice chat gateway may receive a communication request from a calling party. The communication request may be received over a data network (e.g., data network 111), a public switched telephone network (e.g., telephone network 107) or a digital voice telephone network (e.g., network 109). In step 305, the voice chat gateway may determine an address to which the communication request is directed. For example, the address may specify a messaging service username or account identifier or, alternatively or additionally, include a telephone number. In steps 310 and 330, the voice chat gateway may determine whether the address is a messaging service address or a telephone number, respectively. If the address corresponds to a message service address, the voice chat gateway may then determine whether the communication request is to be redirected to a telephone number in step 315. The voice chat gateway may make this determination based on user specified configuration data. For example, a user such as the called party may specify that all calls or voice chats directed to the user's messaging service account are to be rerouted to a particular telephone number. These specifications may be stored in a database and retrieved by the voice chat gateway upon receiving a communication request directed to the user.

If the communication request is to be redirected, the voice chat gateway may determine the telephone number or address (e.g., an IP address in the case of voice over IP telephony) to which communications are to be routed in step 320. Again, this determination may be made based on predefined configuration information specified by the called party and stored in a database (e.g., database 220 of FIG. 2C). Once the telephone number or address has been identified, the voice chat gateway may initiate a telephone call to the called party at the identified telephone number or address in step 325. If there is an answer by the called party, as determined in step 350, the voice chat gateway may establish a connection between the parties in step 355. Communication data between the parties may then be transcoded (if necessary) and transmitted through this connection in step 360. In one example, audio signal received over a PSTN network may be converted and packetized into IP data packets for transmission over the Internet. If there is no response to the communication request, the calling party may be redirected to voicemail in step 365. Optionally, the voice chat gateway may cause an email to be sent to the called party notifying the called party of the missed call and voicemail in step 370.

If, on the other hand, the voice chat gateway determines that the communication request is not to be redirected to a telephone number, the voice chat gateway may, instead, initiate a voice chat through the messaging service to the called party in step 345. Communications may then be processed in a manner as described in steps 350-370.

If the voice chat gateway determines that the communication request is addressed to a telephone number, the voice chat gateway may determine whether communications to the called party is to be redirected to a messaging service address in step 335. If so, the voice chat gateway may determine a messaging service address to which communications are to be redirected for the called party in step 340 and initiate a voice chat session with the called party in step 345. Alternatively, if communications are not to be redirected, the voice chat gateway may proceed to step 325 (i.e., initiating a telephone call to the called party). Once either a voice chat or telephone call has been initiated, the voice chat gateway may manage the communications as described with respect to steps 350-370.

If the address to which the communication request is directed is neither a messaging service address nor a telephone number, the system may return an error indicating that the address is unknown or not understandable in step 375.

FIG. 4 illustrates an example method for initiating a voice chat session through a voice communication network using a telephone communication device. By way of example, a user may wish to call a friend at the friend's voice chat account rather than the friend's telephone number. Accordingly, FIG. 4 provides a method by which the user may enter the friend's voice chat address into the user's telephone device (rather than a telephone number) to establish communications with the friend. In step 400, a voice chat gateway may receive a voice chat request from a calling party over a network such as a digital voice network (network 109 of FIG. 1). In step 405, the voice chat gateway may determine a messaging service address from the voice chat request. The voice chat gateway may then determine whether the messaging service address is valid in step 410. Determining validity of a messaging service address may include querying a user database to confirm the existence of a user or account corresponding to that address. In one example, the voice chat gateway may query a messaging service to determine whether the indicated messaging service address exists. Validity may also depend on privacy settings (e.g., if a called party disables communication requests from strangers), time of day communication restrictions and the like.

If the address is not valid, the voice chat gateway may return an error message to the calling party in step 415. If, however, the address is valid, a voice chat request may be generated and transmitted to the specified messaging service address in step 420. In step 425, the voice chat gateway may determine whether the voice chat was accepted. For example, the called party may have the option to reject the voice chat. If the voice chat request was rejected, the voice chat gateway may reject the call and send a corresponding notification to the calling party in step 435. Alternatively, if there was no response to the voice chat request, the voice chat gateway may redirect the calling party to a voice mail server in step 440. Alternatively or additionally, if the called party is not available or has not accepted the communication request, the voice chat gateway may identify a second number or address at which the called party might be reached.

If the voice chat request is accepted, the voice chat gateway may process and transmit audio and other communication data through the messaging service to the called party in step 430. Processing of communications may include formatting, transcoding and/or otherwise modifying audio according to various protocols (e.g., messaging service protocols when transmitting to the called party and telephone network communications when transmitting to the calling party). For example, processing may include adjusting bit rate, converting analog audio to digital signals, modifying transmission protocols based on a destination network and the like.

Figure 5A:
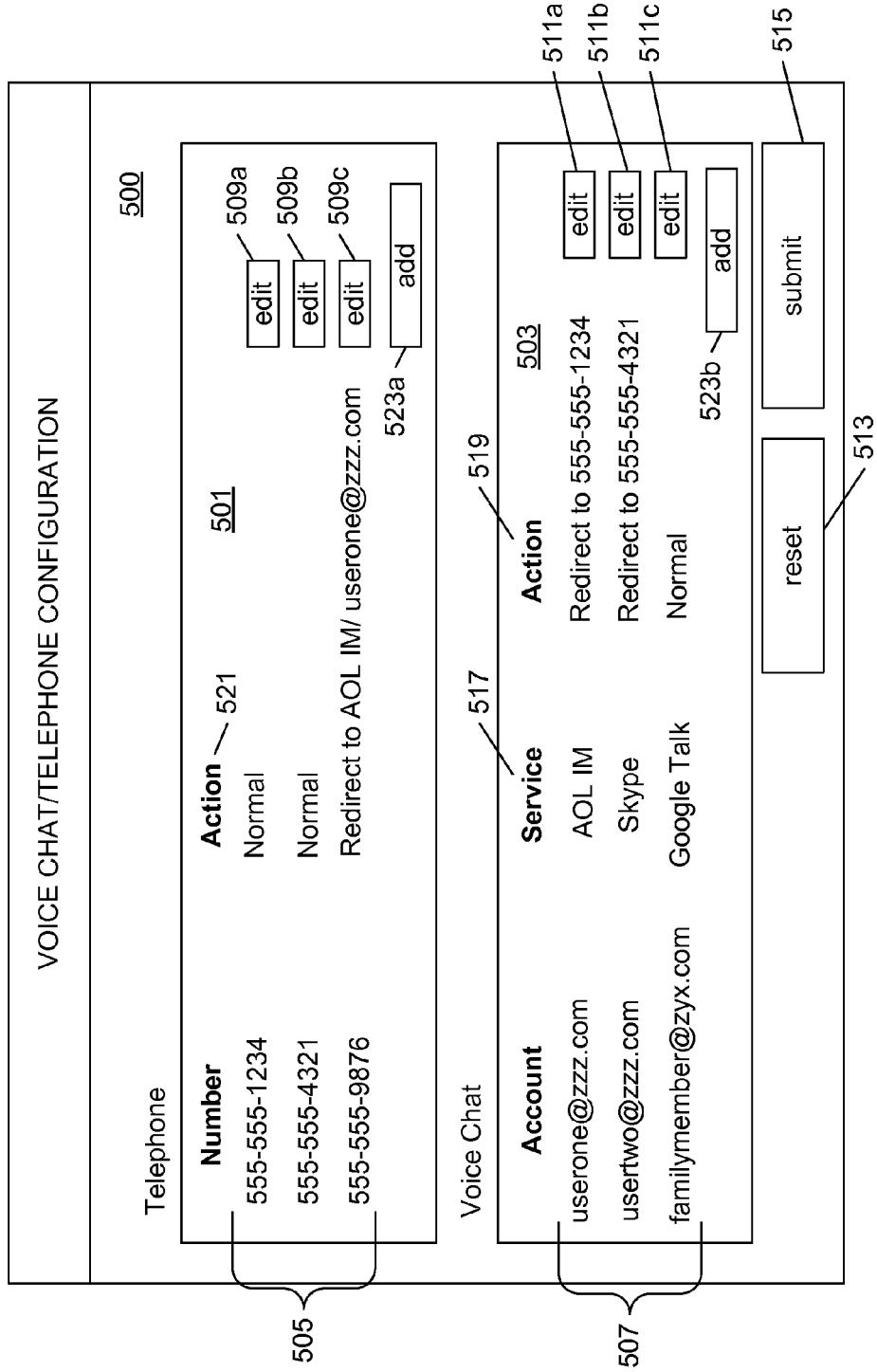
FIGS. 5A-5C illustrate example call processing configuration interfaces according to one or more aspects described herein.

FIG. 5A illustrates an example messaging interface for configuring telephone and voice chat processing features. For example, interface 500 may allow a user to configure how incoming voice chat and telephone communications are directed. Interface 500 includes a telephone configuration section 501 and a voice chat configuration section 503 for displaying the status of and providing configuration options for telephone numbers 505 and voice chat accounts 507, respectively. For telephone numbers, a user may define what action 521 is to be taken when someone tries to reach the user at one of numbers 505. In one example, a user may specify that that calls to telephone number "555-555-1234" are to be treated in a normal manner. Normal treatment of a telephone call may be defined in either an IMS or voice chat gateway or both as allowing the call to reach a specified destination without redirection. In another example, the user may specify that calls to phone number "555-555-9876" are to be redirected to instant messaging service AOL at the account userone@zzz.com. A gateway may process such a redirection by providing audio and call information through a voice chat session as described herein. Additional telephone numbers and voice chat accounts may be added using options 523a and 523, respectively. Actions 521 for telephone numbers 505 may be edited using options 509.

Figure 5B:
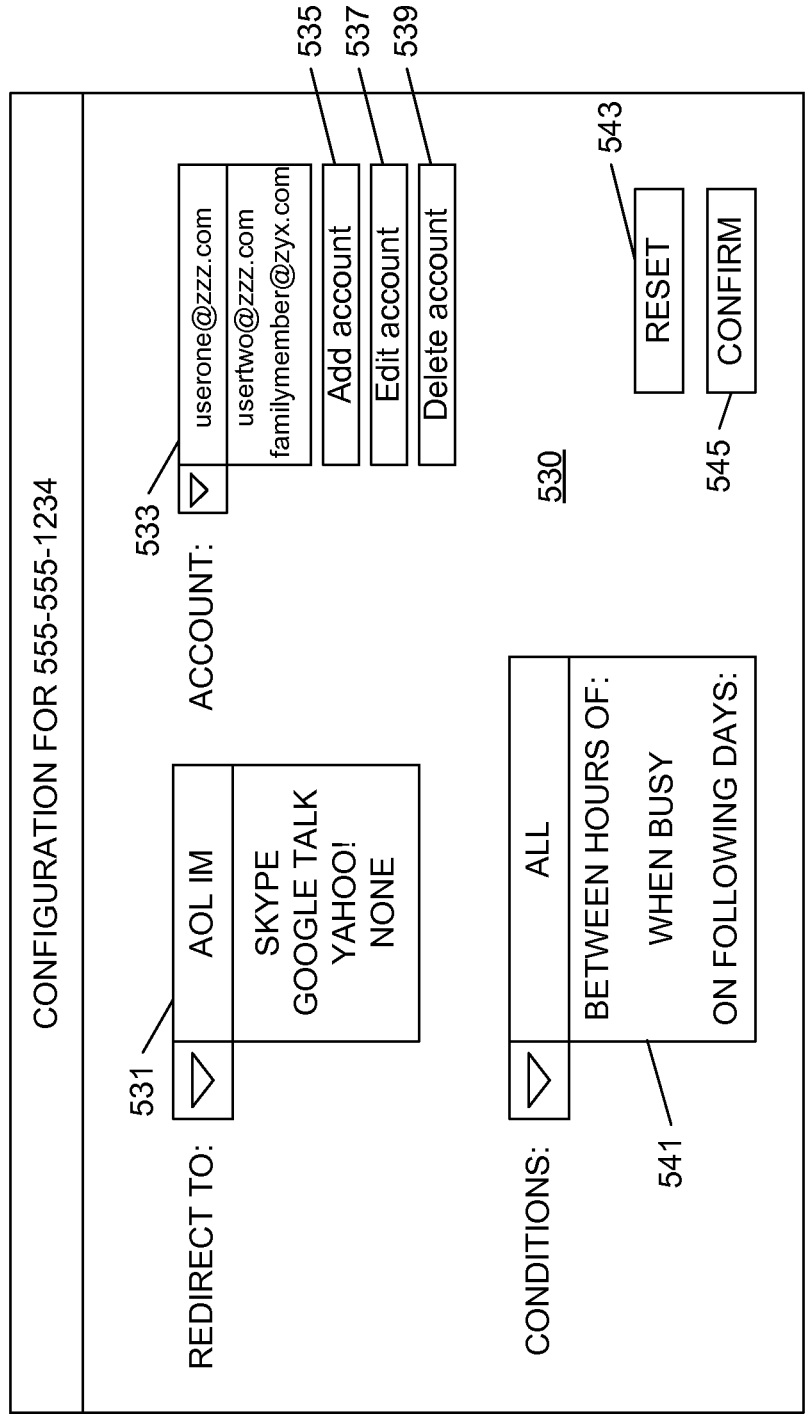

FIG. 5B illustrates an example configuration interface 530 for specifying a manner in which calls to a number (e.g., "555-555-1234" are to be treated. Interface 530 includes a redirect menu 531 that allows a user to select an instant messaging service to which calls are to be redirected. Alternatively, the user may select "none" to indicate that calls to the number are not to be redirected. In one or more arrangements, the user may also be provided with telephone number options in menu 531. Thus, a user may specify that calls to a first number are to be redirected to a second number. Menu 533 provides a list of accounts associated with the selected instant messaging service. A user may have multiple accounts with an instant messaging service and thus, the user may be asked to identify the account to which calls are to be directed. The user may add an account using option 535, edit details of the account by selecting option 537 or delete an account using option 539. Details of the account may include a password, security information and the like. According to one or more aspects, a voice chat gateway may use the account details to log in to a corresponding instant messaging service to act as a proxy for the user.

A user may further specify conditions under which the redirection is to take place using conditions menu 541. For example, a user may specify that redirection is to occur at all times under any condition, or, alternatively, may specify a range of hours or days in which the redirection is to be effected. A user may also define other conditions such as a "when busy" condition that provides redirection when the destination number is busy. For example, a voice chat gateway may detect a busy signal through the telephone network. Various other conditions may also be defined and used. If the user wishes to reset the options of interface 530 to default settings, the user may select reset option 543. Alternatively or additionally, if the user has finalized the settings, the user may select confirm option 545 to have the settings saved and put into effect.

Referring again to FIG. 5A, configuration interface 500 includes a voice chat configuration section 503 that includes a list of accounts 507 associated with a user, the service 517 to which each of the accounts 507 corresponds and an action 519 that is to be taken upon receiving an incoming voice chat request to each of accounts 507. For example, voice chat requests to userone@zzz.com and usertwo@zzz.com com may be redirected to numbers "555-555-1234" and "555-555-4321," respectively, while requests to familymember@zyx.com may be processed normally (i.e., sent to instant messaging account familymember@zyx.com without redirection). Each of actions 519 and accounts 507 may be modified using edit options 511.

Figure 5C:
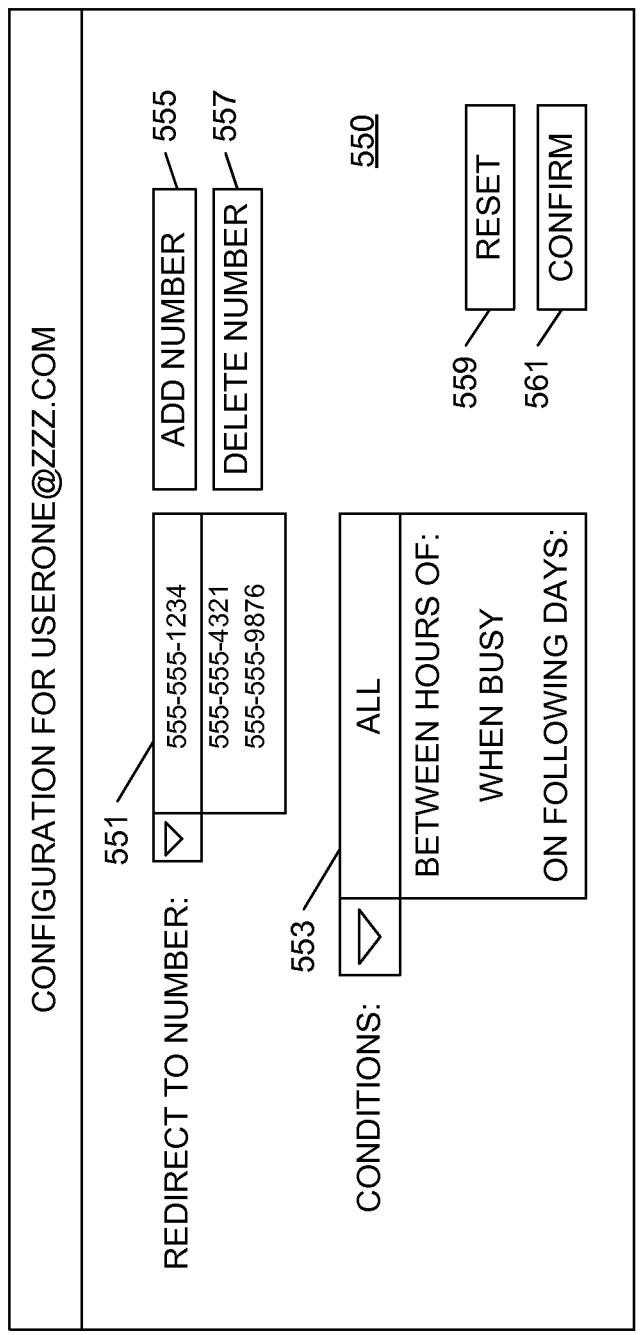

FIG. 5C illustrates an example voice chat configuration interface 550 that includes a drop-down menu 551 for selecting a telephone number or address to which voice chats are to be redirected and a condition menu 553 for defining a condition under which the redirection is to be effected. Numbers may be added or deleted using options 555 and 557, respectively. A user may further reset the settings using option 559 or confirm the settings using option 561. Confirmation of the settings may place the settings into effect.

In one or more configurations, a voice communications service provider may request that users associate a telephone number with the voice chat account(s) to or from which calls may be redirected. FIG. 6A illustrates an association between UserOne's home voice number 605 and four different voice chat accounts 610. Association may include storing the telephone number 605 with the voice chat accounts 610 in an account database. Such an association may provide authorization for a user to redirect calls to or from the voice chat accounts 610 and telephone number 605. For example, when determining whether a user is authorized to have voice chats redirected to a particular phone number or whether a user is authorized to have telephone calls redirected to a voice chat account, a voice chat gateway may consult the associations defined in the account database. Alternatively or additionally, multiple telephone numbers may be associated with one another and with one or more voice chat accounts.

In one example, as illustrated in FIG. 6B, a user may associate a mobile telephone number with a voice number 705 issued by the service provider (i.e., "555-333-5151"). The mobile telephone number 710 (i.e., "555-555-1234") may be issued by a third-party service provider; however, incoming calls to the mobile telephone number 710 may be managed by the service provider by linking the mobile telephone number 710 to the voice number 705 issued by the service provider. Accordingly, calls to the mobile phone number 710 may be redirected to one of voice chat accounts 715 as if the call were directed to voice number 705. Similarly, if a voice chat request is directed to one of voice chat accounts 715, the voice chat may be directed to mobile phone number 710. In one or more arrangements, telephone number 705 may be a virtual number. That is, while a number is assigned to the user, no corresponding physical telephone line exists at a user location. This may allow a user to keep his or her mobile telephone number 710 private. Additionally, if a user switches numbers often (e.g., on travel), the use of a virtual telephone number allows a user to provide a single consistent number to others.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out various features have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

I claim:

1. A messaging system comprising:
   one or more processors; and
   memory storing computer readable instructions that, when executed by at least one of the one or more processors, cause the messaging system to:
   receive information identifying how to route communication requests, the information comprising a plurality of communication destinations, wherein the plurality of communication destinations comprises at least a first messaging in service account of a messaging service and a second messaging service account of the messaging service;
   receive a communication request from a communication-initiating user, wherein the communication request is directed to an intended recipient; and
   determine, based on the received information, one of the plurality of communication destinations to route the communication request, wherein the information is specified by the intended recipient.

2. The messaging system of claim 1, wherein the determined one of the plurality of communication destinations comprises the first messaging service account, and wherein the instructions, when executed, further cause the system to establish a voice chat with the intended recipient through the first messaging service account.

3. The messaging system of claim 1, wherein the information comprises an instruction to direct a communication request to a first communication destination under a first condition and an instruction to direct the communication request to a second communication destination under a second condition.

4. The messaging system of claim 3, wherein the first condition comprises a time of day.

5. The messaging system of claim 1, wherein the instructions, when executed, further cause the messaging system to generate a user interface comprising:
   a first field configured to receive destination information for directing communication requests; and
   a second field associated with the first field, the second field configured to receive a condition under which the system is to direct communication requests to a destination specified by the destination information.

6. The messaging system of claim 1, wherein the communication request is received through a telephony network and comprises a messaging service identifier of the intended recipient.

7. The messaging system of claim 1, wherein the instructions, when executed, cause the messaging system to receive the information by:

receiving a first user specification to redirect communication requests directed to a first communication destination to a second communication destination; and receiving a second user specification to redirect communication requests directed to a third communication destination to a fourth communication destination.

8. A method comprising:

receiving, by a computing device, user input specifying a first communication destination receiving further user input specifying a plurality of communication destinations to which communication requests directed to the first communication destination are to be routed, wherein the plurality of communication destinations comprises at least a first messaging service account of a messaging service and a second messaging service account of the messaging service;

determining a first condition under which communication requests to the first communication destination are to be routed to one of the plurality of communication destinations; and processing a communication request directed to the first communication destination in accordance with the user input specifying the first communication destination, the further user input specifying the one of the plurality of communication destinations and the determined first condition.

9. The method of claim 8, wherein receiving the user input specifying the first communication destination comprises receiving a telephone number.

10. The method of claim 9, wherein receiving the further user input specifying the plurality of communication destinations comprises receiving a messaging service identifier.

11. The method of claim 8, wherein receiving the user input specifying the first communication destination comprises receiving a messaging service identifier.

12. The method of claim 8, wherein determining the first condition comprises determining a range of times.

13. The method of claim 8, wherein determining the first condition comprises determining when a destination party associated with the first communication destination is busy.

14. The method of claim 8, further comprising:

determining a second condition under which communication requests to the first communication destination are to be routed to a different communication destination of the plurality of communication destinations, wherein the first condition is different from the second condition.

15. A method comprising:

receiving, by a computing device, a user specification of a manner in which to route communication requests, the user specification including a plurality of communication destinations for an intended recipient, wherein the plurality of communication destinations comprises at least a first messaging service account of a messaging service and a second messaging service account of the messaging service;

receiving a communication request from a communication-initiating user, wherein the communication request is directed to the intended recipient; and using the received user specification to determine one of the plurality of communication destinations to route the communication request.

16. The method of claim 15, wherein determining the one of the plurality of communication destinations comprises determining the first messaging service account, and wherein the method further comprises:

establishing a voice chat with the intended recipient through the determined first messaging service account.

17. The method of claim 15, wherein receiving the user specification comprises:

receiving an instruction to direct a communication request to a first communication destination under a first condition; and receiving an instruction to direct the communication request to a second communication destination under a second condition.

18. The method of claim 17, further comprising receiving the first condition including a time of day.

19. The method of claim 15, wherein receiving the user specification comprises generating a user interface comprising:

a first field configured to receive destination information for directing communication requests; and a second field associated with the first field, the second field configured to receive a condition for directing communication requests to a destination specified by the destination information.

20. The method of claim 15, wherein receiving the user specification comprises:

receiving a first user specification to redirect communication requests directed to a first communication destination to a second communication destination; and receiving a second user specification to redirect communication requests directed to a third communication destination to a fourth communication destination.

21. The messaging system of claim 1, wherein the communication request comprises an address for a destination device of the intended recipient;

wherein the instructions, when executed, cause the messaging system to:

determine whether the address is a messaging service address or a telephone number; and in response to a determination that the address is not the messaging service address or the telephone number, generate an error.

22. The messaging system of claim 1, wherein the determined one of the plurality of communication destinations comprises the first messaging service account of the messaging service;

wherein the computer readable instructions, when executed, cause the messaging system to:

use a different message service to invoke function calls of the messaging service on the first messaging service account.

* * * * *